United States Patent Office 2,861,346
Patented Nov. 25, 1958

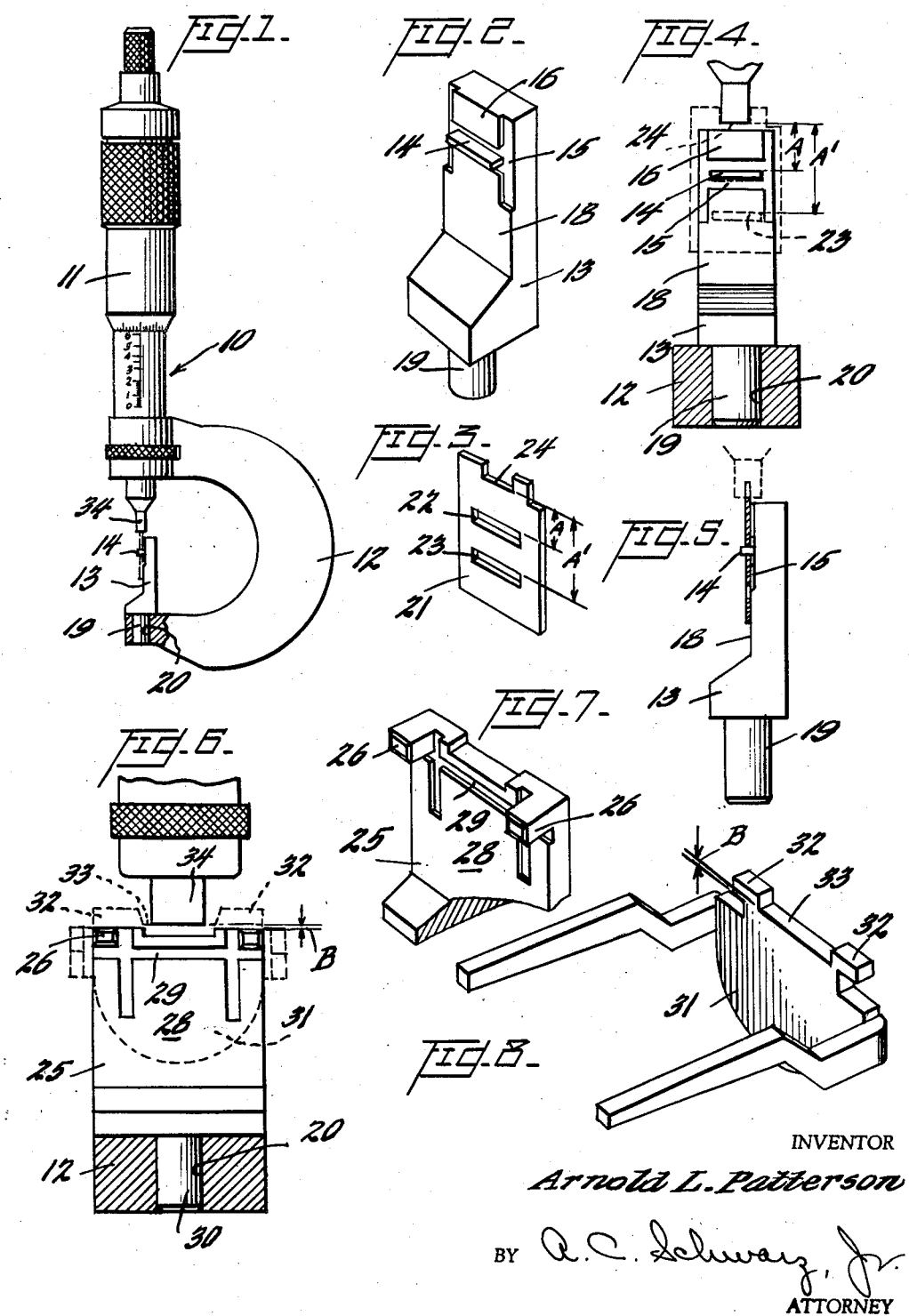

2,861,346

MICROMETER GAGE

Arnold L. Patterson, Houstonville, N. C., assignor to Western Electric Company, Incorporated, New York, N. Y., a corporation of New York Application September 1, 1955, Serial No. 532,031

3 Claims. (Cl. 33—167)

This invention relates generally to improvements in the class of measuring instruments commonly known as micrometers and more specifically to improvements in micrometer anvils which will permit the taking of measurements not possible with ordinary or standard micrometers.

It is frequently necessary, in the construction of electrical relays and other apparatus, to manufacture large quantities of small piece parts which must be dimensionally maintained within extremely small tolerances. As is often the case, the critical or controlling dimensions of these piece parts are such that they are not readily ascertained by utilizing standard micrometers or other standard types of measuring instruments. However, it is essential that some means be devised to determine whether or not these critical dimensions be within the tolerance extremes in order to insure proper functioning of the completed relays, at least from a mechanical standpoint.

Prior to this invention a common procedure for making measurements of this type was to utilize gages of the go-no-go type in order to determine the suitability of the controlling dimensions. As has already been indicated, the dimensions being checked are such that standard measuring instruments are not suitable and hence, gages of the go-no-go type which can be used for the stated purposes are of necessity quite complex of shape and both difficult and expensive to produce. Further, once a part had been determined to be unsuitable by means of a go-no-go type gage, there was still no convenient means for determining the amount of material which should be removed to salvage those parts which were capable of being salvaged. It can be seen, therefore, that considerable expense and delay could be eliminated if it were possible to determine dimensions of this nature with a measuring instrument of the micrometer type. In order to perform these measuring functions with the degree of accuracy required, the instrument utilized must be capable of rapid use and it must also be able to repeat measurements with extreme accuracy. These requirements find their best solution in a micrometer provided with a special type of anvil which will adapt the micrometer to the particular part being measured. The micrometer must be accurately constructed and yet capable of compensating for all possible deviations of the parts from the standard or desired measurements.

Therefore, it is an object of this invention to provide an instrument capable of ascertaining dimensions of such nature that they are not capable of being determined by standard measuring instruments.

It is another object of this invention to provide an instrument capable of rapid use in measuring large quantities of small piece parts.

It is a further object of this invention to provide an instrument capable of a high degree of accuracy and repeatability.

In accordance with the above objects, one embodiment of the present invention provides an instrument comprising a standard micrometer spindle and yoke provided with a special anvil adapted to permit measurement of the distance between two parallel surfaces of a piece part which are linearly aligned with another portion of the piece part in such a manner as to prevent engagement of one of the two parallel surfaces with a standard micrometer anvil or spindle tip. A second embodiment of the present invention provides an instrument comprising a standard micrometer spindle and yoke provided with another special anvil adapted to permit measurement of the perpendicular distance between two parallel surfaces of a piece part which are not linearly aligned and which thereby prohibit the simultaneous engagement of both surfaces with the anvil and spindle tip of a standard micrometer.

Other objects and advantages of the present invention will become apparent from the following detailed description and the accompanying drawings, wherein:

Fig. 1 is a side elevation view, partially in section, of a micrometer provided with a special anvil according to the first embodiment of the present invention;

Fig. 2 is an enlarged perspective view of a special anvil according to the first embodiment of the present invention;

Fig. 3 is an enlarged perspective view of a relay piece part illustrating the dimensions thereof which it is desired to measure;

Fig. 4 is an enlarged fragmentary end elevation of the micrometer of Fig. 1 as viewed from the left and illustrating in dotted lines the piece part of Fig. 3 in position to be measured;

Fig. 5 is a side elevation view of Fig. 4 illustrating the piece part of Fig. 3 in full section;

Fig. 6 is a view similar to Fig. 4 of a special anvil according to the second embodiment of the present invention and illustrating a piece part in position to be measured;

Fig. 7 is a fragmentary perspective view of the anvil of Fig. 6, and

Fig. 8 is a view similar to Fig. 3 of another type of relay piece part.

Attention now is directed to the accompanying drawings, and particularly Figs. 1 to 5, wherein like numerals of reference designate like elements throughout the several views and wherein there is illustrated a micrometer designated generally by the numeral 10 and provided with a special anvil according to the first embodiment of the present invention.

The micrometer 10 is constructed of a thimble 11, a yoke 12, and an anvil 13. The thimble 11 and yoke 12 are both well known in the art and consequently will not be discussed in detail here.

The anvil 13 is provided with a rectangular projection 14 (Fig. 2), which projection 14 is surrounded by an undercut portion 15 of H-shape in configuration which serves to prevent the formation of fillets between the lateral surfaces of the projection 14 and the faces 16 and 18 of the anvil 13. The anvil 13 is further provided with a cylindrical projection 19 of such diameter as will permit it to be received as a press fit in an aperture 20 of the yoke 12.

In Fig. 3 is disclosed a piece part 21 provided with apertures 22 and 23 and a cut out portion 24. The dimensions which it is desired to measure on this piece part 21 are indicated by the reference characters A and A' and constitute the distances between the bottom surface of the cut out portion 24 and the upper surfaces of the apertures 22 and 23 respectively.

Reference will now be made to Figs. 6 to 8 wherein is disclosed a micrometer anvil 25 in accordance with the second embodiment of the present invention. The anvil 25 is provided with a pair of projecting portions 26 (Fig. 7), which projections 26 are set off from the face 28 of the anvil 25 by means of a generally H-shaped undercut portion 29 to perform a function similar to that of the undercut portion 15 of the first anvil 13. The anvil 25 is further provided with a cylindrical projection 30 which is of such size that it may be received as a press fit in the aperture 20 of the yoke 12.

In Fig. 8 is disclosed a relay armature 31 provided with pivoting projections 32 and a cut out portion 33. The dimension which it is desired to measure on this piece part 31 is indicated by the reference character B and constitutes the distance between the bottom surface of the cut out portion 33 and the under surfaces of the pivoting projections 32.

It will be apparent by reference to the drawing that the aperture 20 in the yoke 12 is in axial alignment with the longitudinal axis of the spindle 34. The anvils 13 and 25 are both cut away to provide the faces 18 and 28, which are offset from a prolongation of the axis of the spindle 34, and thus the projection 14 and projecting portions 26, which extend transversely of the prolongation of the axis of the spindle 34 will have their gaging surfaces in planes which intersect the prolongation of the axis of the spindle 34. As a consequence of this construction, the surfaces of the projections 14 and 26, against which a part being gaged will rest during the gaging operation, cooperate with the gaging face of the spindle 34 to effect a highly accurate measurement.

In order that a better understanding of the invention may be had, the methods of constructing and utilizing the special micrometers of the present invention will now be described. The procedure for making special micrometers in accordance with the disclosed embodiments of the present invention is extremely simple. The standard cylindrical anvil of a commercial micrometer is removed and a special anvil of either of the types disclosed is attached to the micrometer by pressing the cylindrical projection 19 or 30 into the aperture 20 of the yoke 12 on the micrometer 10. The micrometer reading is then set to some convenient dimension with a standard gage block of known thickness positioned between the tip of spindle 34 (Figs. 1 and 6) and the upper measuring surface of the anvil projections 14 or 26. The difference between this preset reading and the thickness of the gage block is then the amount which must be subtracted from the indicated dimension to obtain the true dimension of a piece part being measured. For convenience and availability, this difference may be stamped on the yoke 12.

To measure the dimension designated A (Fig. 3), the piece part 21 is mounted on the anvil 13 with the projection 14 positioned in the aperture 22 and the part 21 pressed firmly against the surfaces 16 and 18 of the anvil 13 as illustrated in Fig. 5. The thimble 11 is then rotated to advance the spindle 34 into the cut out portion 24 of the part 21 until the spindle contacts the bottom of the cut out portion 24. The measurement indicated on the barrel and thimble of the micrometer 10, less the difference in dimensions mentioned in the paragraph next above, is then the true distance designated by the reference character A. To determine the distance A', the above procedure is repeated except that the projection 14 is now positioned in the aperture 23 rather than the aperture 22.

To measure the dimension designated B (Fig. 8), the relay armature 31 is placed on the anvil 25 with the under surfaces of the pivoting projections 32 resting on the upper surfaces of the anvil projections 26 and the armature 31 held firmly against the surface 28 of the anvil 25 as illustrated in Fig. 6. The thimble 11 is then rotated in such a manner as to advance the spindle 34 into engagement with the bottom surface of the cut out portion 33 in the armature 31. The indication read on the barrel and thimble of the micrometer 10, less the difference in dimensions indicated above, is then the true dimension indicated by the reference character B.

This instrument combines the advantages of ease of use and accuracy necessary to permit the economical determination of the indicated measurements on large quantities of small parts.

It is to be understood that various additions or modifications could be made to the embodiments disclosed herein by those skilled in the art to extend the present invention and achieve a similar instrument which is still within the spirit and scope of the present invention.

What is claimed is:

1. A micrometer-caliper for measuring a dimension of a piece-part, which comprises a semicircular yoke, a spindle mounted at a first extremity of the yoke, a thimble mounted coaxially with the spindle in such a manner as to cause longitudinal movement of the spindle upon rotation of the thimble about its longitudinal axis, and an anvil secured to the second extremity of the yoke in a position axially aligned with the spindle, the anvil having an offset portion disposed parallel to the longitudinal axis of the spindle but out of the path of movement of said spindle and means extending laterally from the offset portion of the anvil and having a reference surface positioned perpendicular to the longitudinal axis of the spindle and located a predetermined distance from the second extremity of the yoke, said last-mentioned means being designed to support a piece-part a dimension of which is to be measured from a surface of said piece-part engaged by said reference surface along a line coincident with the longitudinal axis of the spindle so that when the spindle is advanced along its longitudinal axis into engagement with an upper surface of the piece-part a distance extending from the surface in engagement with the spindle to the reference surface on the means supporting the piece-part is measured along a line coincident with the longitudinal axis of the spindle.

2. A micrometer-caliper for measuring a dimension of a piece-part which comprises a semicircular yoke, a spindle mounted at a first extremity of the yoke, a thimble mounted coaxially with the spindle in such a manner as to cause longitudinal movement of the spindle upon rotation of the thimble about its longitudinal axis, and an anvil secured to the second extremity of the yoke in a position axially aligned with the spindle, the anvil having an offset portion disposed parallel to the longitudinal axis of the spindle but out of the path of movement of said spindle, a projection of rectangular configuration extending laterally from said offset portion and having a reference surface positioned perpendicular to the longitudinal axis of the spindle and located a predetermined distance from the second extremity of the yoke, the lateral projection being designed to be received within a complementary rectangular opening in a piece-part to support said piece-part, a dimension of which is to be measured from the reference surface along a line coincident with the longitudinal axis of the spindle so that when the spindle is advanced along its longitudinal axis into engagement with an upper surface of the piece part a distance extending from said upper surface to the reference surface on the lateral projection engaging an internal surface of the opening in the piece-part is measured along a line coincident with the longitudinal axis of the spindle.

3. A micrometer-caliper for measuring a dimension of a piece-part, which comprises a semicircular yoke, a spindle mounted at a first extremity of the yoke, a thimble mounted coaxially with the spindle in such a manner as to cause longitudinal movement of the spindle upon rotation of the thimble about its longitudinal axis, and an anvil secured to the second extremity of the yoke in a position axially aligned with the spindle, the anvil having an offset portion disposed parallel to the longitudinal axis of the spindle but out of the path of movement of said spindle, a plurality of projections of rectangular configuration extending laterally from said offset portion, each of said projections having a reference surface lying in a common plane perpendicular to the longitudinal axis of the spindle and located a predetermined distance from the second extremity of the yoke, the lateral projections being designed to be received within complementary rectangular notches formed in the piece-part and to support said piece-part a dimension of which is to be measured from the common plane containing the reference surfaces on the lateral projections along a line coincident with the longitudinal axis of the spindle so that when the spindle is advanced along its longitudinal axis into engagement with the upper surface of the piece-part a distance extending from said upper surface to the common plane of the reference surfaces is measured along a line that is coincident with the longitudinal axis of the spindle.

References Cited in the file of this patent

UNITED STATES PATENTS

| | | |
|---|---|---|
| 1,226,396 | Slocomb | May 15, 1917 |
| 1,333,453 | Sardo et al. | Mar. 9, 1920 |
| 2,541,821 | Kneissler | Feb. 13, 1951 |